United States Patent
Azman et al.

(10) Patent No.: US 7,171,165 B2
(45) Date of Patent: Jan. 30, 2007

(54) METHOD FOR DETERMINING A TRANSMISSION RATE ON THE REVERSE COMMON SIGNALING CHANNEL OF A WIRELESS SYSTEM

(75) Inventors: Utku Azman, Morristown, NJ (US); Douglas N. Knisely, Wheaton, IL (US); Tejaskumar R. Patel, Randolph, NJ (US); David Albert Rossetti, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 595 days.

(21) Appl. No.: 10/626,393

(22) Filed: Jul. 24, 2003

(65) Prior Publication Data

US 2005/0020213 A1  Jan. 27, 2005

(51) Int. Cl.
*H04B 1/00* (2006.01)
(52) U.S. Cl. .................. 455/69; 455/67.11; 370/230
(58) Field of Classification Search .............. 455/69, 455/67.11; 370/335, 342, 230
See application file for complete search history.

(56) References Cited

U.S. PATENT DOCUMENTS

| 6,456,652 | B1 * | 9/2002 | Kim et al. ................ 375/224 |
| 6,563,810 | B1 | 5/2003 | Corazza ..................... 370/335 |
| 2002/0072885 | A1 | 6/2002 | Tang .............................. 703/3 |
| 2003/0086371 | A1 | 5/2003 | Walton et al. ............. 370/235 |
| 2003/0093364 | A1 * | 5/2003 | Bae et al. ..................... 705/37 |
| 2004/0242231 | A1 * | 12/2004 | Tang et al. ................. 455/434 |

FOREIGN PATENT DOCUMENTS

| EP | 1 259 015 | 11/2002 |
| EP | 1 370 010 | 12/2003 |

OTHER PUBLICATIONS

European Search Report.

* cited by examiner

*Primary Examiner*—Lee Nguyen
(74) *Attorney, Agent, or Firm*—Stephen M. Gurey

(57) ABSTRACT

A mobile terminal selects a transmission rate for the reverse common signaling channel in response to at least one mobile-terminal-measured metric that is associated with the RF conditions of the channel. The mobile terminal is provided with information, where the information takes the form of at least one threshold level that the one or more measured metrics are compared with, to determine the rate at which at which the mobile terminal should transmit.

22 Claims, 3 Drawing Sheets

500

| MSG LEN | MSG ID | POWER RELATED | SUPPORTED RATES | ... | REVERSE CHANNEL | ... | CRC |
|---|---|---|---|---|---|---|---|
| 501 | 502 | 503 | 504 | | 505 | | 506 |

500

| MSG LEN | MSG ID | POWER RELATED | SUPPORTED RATES | ... | REVERSE CHANNEL | ... | CRC |
|---|---|---|---|---|---|---|---|
| 501 | 502 | 503 | 504 | | 505 | | 506 |

505

| $E_c/I_o$ 19200 | $\hat{I_o}$ 19200 | $E_c/I_o$ 38400 | $\hat{I_o}$ 38400 | RE-PROBE OFFSET |
|---|---|---|---|---|
| 601 | 602 | 603 | 604 | 605 |

METHOD FOR DETERMINING A TRANSMISSION RATE ON THE REVERSE COMMON SIGNALING CHANNEL OF A WIRELESS SYSTEM

TECHNICAL FIELD

The present invention relates to wireless telecommunications.

BACKGROUND OF THE INVENTION

In existing 2G wireless systems, according to applicable IS-95 standards, the messages transmitted on the reverse access channel (R-ACH) used by the mobile terminals within a base station's coverage area for providing a presence indicator to the network, for mobility management, and for indicating to the network when a call is to be placed, are at a fixed data rate of 4800 bps In newer 3G wireless systems (e.g., CDMA2000), supported by IS2000 standards, a variety of rates (e.g., 9600 bps, 19200 bps and 38400 bps) using the reverse enhanced access channel (R-EACH) can be supported. In accordance with the standards applicable to these newer systems, a base station advertises which rates it supports and a maximum allowed transmit time of a message in an overhead message that is transmitted to all the operating mobile terminals within the base station's coverage area. A mobile terminal, using the received information as to what rates are supported and the maximum transmit time for a message, and the size of the message it has to transmit, determines which rate is possible and then uses that one. If more than one rate is possible, then the mobile terminal, using whatever algorithm the mobile terminal manufacturer has incorporated into their mobile terminal, selects one rate from among the possible rates. With this scenario, no guidance is given to a mobile terminal by the base station in selecting which rate the mobile terminal should use to communicate with the base station, and the base station has no way of influencing the selection of the rate.

Selecting the highest data rate is advantageous to minimize channel latency since a message that takes 100 ms at 9600 bps may only take 25 ms at 38400 bps, a savings of 75 ms for each message on the channel. For applications where common channel latency is important, such as in real time applications like push-to-talk, this latency reduction is important. However, whereas it might be obvious to always select the highest supported rate to transmit at, in fact to achieve the same performance (i.e. Frame Error Rate [FER]), the mobile terminal will need to transmit at a higher power level. Since, the mobile terminals have a fixed maximum allowed output power level, the highest data rate may not always be the "best" data rate for transmission on the R-EACH. Further, a mobile terminal in selecting a rate might be more or less aggressive than the service provider would like. For example, if the message transmitted by the mobile terminal is a probe used for accessing the wireless system and mobile terminal selects a transmission rate that is too high, then one or more additional probes at increasing power levels will be transmitted by the mobile terminal as it attempts to get the base station to recognize and acknowledge the access request. As a result, this could have a deleterious effect on latency. In order for the mobile terminal to operate properly, therefore, it will either have to be too conservative in selecting a transmission rate, or if it selects too high a rate, will suffer the latency-degrading effect of possibly needed to transmit multiple probes until one is recognized. On the other hand, the latency benefits that could be achieved by transmitting at a higher rate are lost by operating conservatively and selecting a transmission rate that is lower than the rate at which the message could have been successfully transmitted to the base station.

A need exists, therefore, for dynamically determining the best transmission rate on the reverse common signaling channel in a wireless system.

SUMMARY OF THE INVENTION

In accordance with an embodiment of the present invention, a mobile terminal selects a transmission rate for the reverse common signaling channel (R-CSCH, a generic term encompassing the IS2000 R-EACH) in response to at least one mobile-terminal-measured metric that is associated with the RF conditions of the channel. In an embodiment of the present invention, a mobile terminal is provided with information, where the information takes the form of at least one threshold level that the one or more measured metrics are compared with, to determine the rate at which at which the mobile terminal should transmit. These metrics are measures of the RF channel, which could be interference limited and/or power limited. In the former, the capacity and data rate of the channel is limited by the interference on the channel, as is typically the case on urban networks. In the latter, the capacity and data rate of the channel is limited by the RF link budget, as is typically the case on rural networks with large cell footprints. Urban in-building coverage is typically limited by both interference and power.

In an embodiment of the invention, a mobile terminal uses the threshold levels provided for comparison with the received pilot strength from the base station in order to control and select an appropriate transmission rate from among the transmission rates supported by the base station. The pilot strength metric, being a signal to noise metric, is most helpful when the RF channel is interference limited. For an embodiment in which three rates are supported, two threshold levels are provided to the mobile terminal for controlling the selection of the rate as a function of the pilot strength measured by the mobile terminal. In an embodiment of the invention, a re-probe threshold offset is also provided to the mobile terminal, which is used to offset the one or more pilot signal strength threshold levels when second or more probes are transmitted after failing to receive an acknowledgement from a base station in response to a previous probe.

In an embodiment of the invention, one or more threshold levels are provided to a mobile terminal for comparison with the measured power spectral density received by a mobile terminal. The power spectral density metric, which is an absolute measurement including both signal and interference, is most helpful when the RF channel is power limited. In an embodiment, a mobile terminal could be provided with one or more pilot strength threshold levels and one or more power spectral density threshold levels, with the mobile terminal selecting as a transmission rate the maximum rate that satisfies both comparisons.

In an embodiment of the invention, one or more pilot strength threshold levels, the re-probe offset value, and/or the one or more received power spectral density threshold levels are transmitted in an overhead message, such as an Enhanced Access Parameters Message, that is continuously broadcast by a base station to the mobile terminals within its coverage area. Alternatively, such threshold levels could be programmed into a mobile terminal's software in accordance with a service provider's specifications, or externally programmed by the wireless network into the mobile terminal's software.

These and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
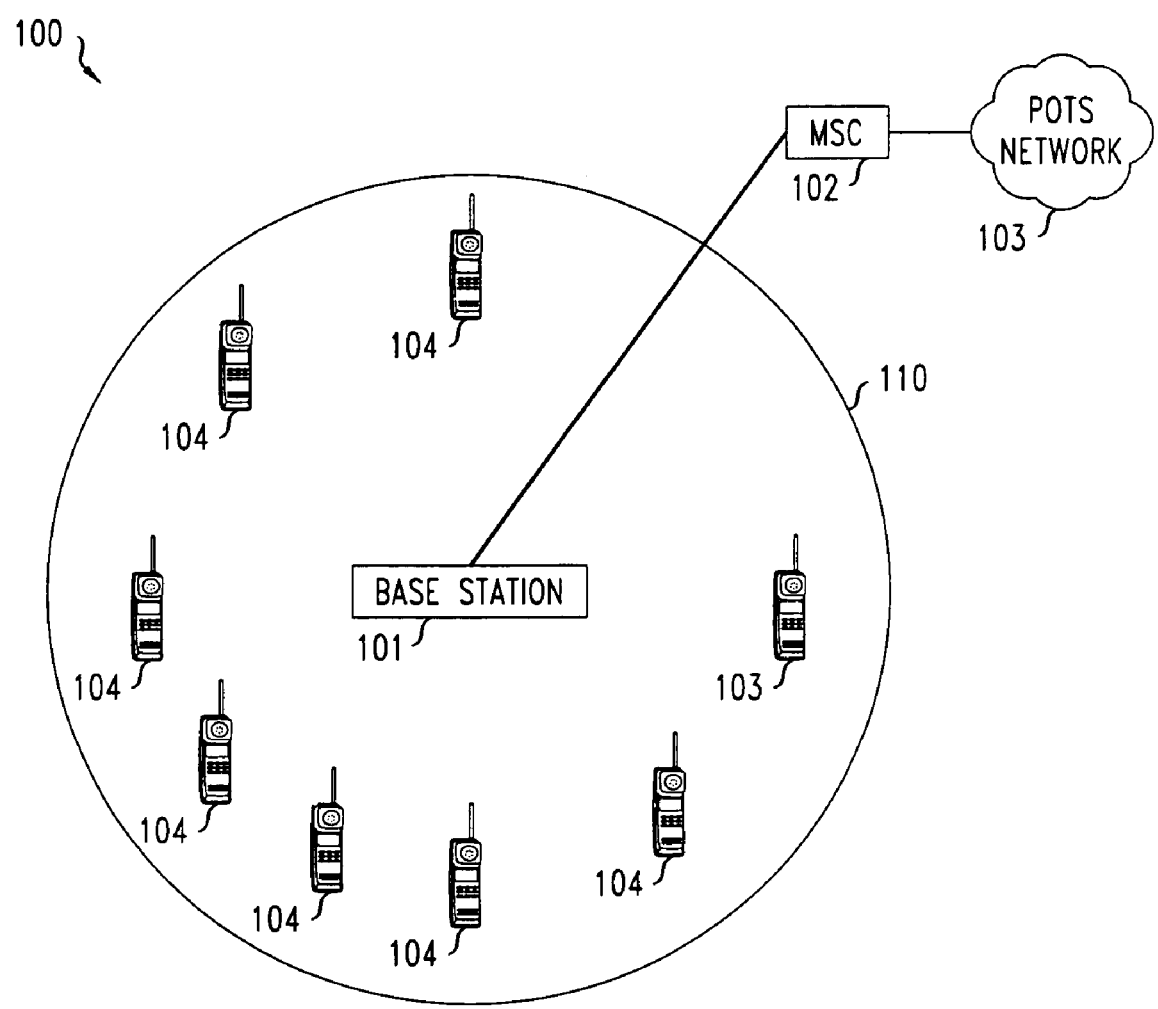
FIG. 1 shows a wireless communications system in which a plurality of mobile terminals are communicating with or attempting to establish communication with a base station.

With reference to FIG. 1, a wireless communications system 100 is shown in which a base station 101 is connected to a Mobile Switching Center (MSC) 102. In certain embodiments, a Base Station Controller (BSC) may be connected between the base station 101 and MSC 102. Other base stations (not shown) will also be connected to MSC 102. MSC 102, in turn, is connected to the wireline POTS telephone network 103. A plurality of mobile terminals 104 can access the wireless network 100 and, in turn, the wireline POTS telephone network 103, through base station 101 as long as they are within the coverage area 110 of that base station. Each time one of the mobile terminals 104 attempts to access the network, it makes an access request on a reverse common signaling channel in the form of an access probe. If the wireless network recognizes the access probe, the base station 101 sends an acknowledgement downlink to the mobile terminal 104 and the mobile terminal stops transmitting any more access probes. If the mobile terminal doesn't receive an acknowledgement from the base station to the probe, it generally will transmit another access probe at a higher power level, and continue to send probes at increasing power levels until either an acknowledgement is received from the base station or a predetermined maximum number of access probes have been transmitted. Failing to receive a response from the base station to any of the access probes transmitted in the first sequence of probes, the mobile terminal will, after a period of time, start to again transmit another sequence of probes that start at the lowest power level and increase from probe-to-probe within the sequence. This process continues until either an acknowledgement is eventually received from the base station, or a maximum number of sequences have been transmitted without having received an acknowledgement, in which case, the call is abandoned.

In addition to indicating to the wireless network that it wishes to place a call, each mobile terminal 104 within the coverage area 110 of base station 101 uses the R-CSCH for signaling its presence within the coverage area 110, and for other mobility management functions. As previously noted, in newer 3G wireless systems supported, for example, by CDMA2000 standards, the R-EACH supports rates of 9600 bps, 19200 bps, and 38400 bps.

The present inventors have recognized that the RF channel-condition-related metrics used by a mobile terminal 104 to determine the power of the signal it needs to transmit back to the base station 101 can also be used to select a transmission rate on the R-CSCH. By comparing one or more of these measured channel-condition-related metrics at the mobile terminal 104 against one or more threshold levels, the mobile terminal can determine a transmission rate for the R-CSCH, where the threshold levels are chosen to differentiate "favorable" RF channel conditions where a higher transmission rate should be selected, and "less favorable" channel conditions where a lower transmission rate should be selected, where both interference and other limitations are factors used in determining such channel conditions. For example, an RF channel could be interference limited, or in other words, the capacity and data rate of the channel is limited by the interference on the channel. This is typically the case in urban networks where traffic levels are high. Alternatively, an RF channel could be power limited, or in other words, the capacity and data rate of the channel is limited by the RF link budget. This is typically the case on rural networks with large cell footprints. Urban in-building coverage is typically limited by both interference and power.

The pilot strength metric, $E_c/I_o$, used by the mobile terminals to determine with which base station to talk, and being a signal-to-noise metric, is most helpful when the RF channel is interference limited. This pilot strength measurement provides an RF interference measurement of the channel, with a high measurement indicative of less RF interference than a low measurement. In the described embodiment, the mobile-terminal-measured pilot strength measurement is used to determine whether to transmit at a higher rate in a low interference environment, or at a lower rate in a higher interference environment where other transmitting mobile terminals on a reverse channel could prevent a transmitted signal by the subject mobile terminal from being successfully received by the base station.

The power spectral density metric, $I_o$, which is an absolute measurement including both signal and interference, is most helpful when the RF channel is power limited. A low measured received power spectral density is indicative that the mobile terminal 104 is likely reaching the edge of the coverage area 110 of base station 101 where channel attenuation is high and where a signal transmitted by a mobile terminal is more likely to be successfully received by the base station if it is transmitted at a lower rather than a higher rate.

Figure 2:
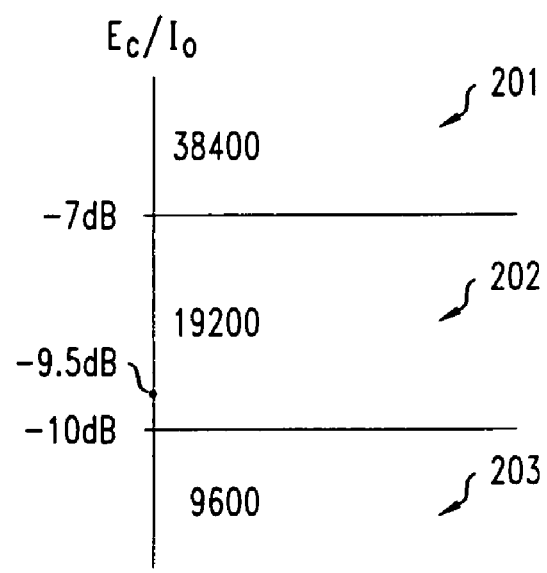
FIG. 2 shows an example determining a transmission rate from among three supported rates by comparing the measured pilot strength with two pilot strength thresholds.

In an embodiment of the present invention, each mobile terminal 104 measures the pilot strength, $E_c/I_o$, and/or the received power spectral density, $I_o$, and compares one or both of those measured metrics with one or more associated threshold levels to determine a transmission rate on the R-CSCH. Specifically, where the base station 101 supports three different transmission rates, operating in accordance, for example, with CDMA2000 standards, a first pilot strength threshold level defines the boundary between a pilot strength measurement region that is representative of favorable channel conditions for which the highest transmission rate is selected, and a pilot strength measurement region that is representative of less favorable channel conditions for which the second highest transmission rate is selected. A second pilot strength threshold level defines the boundary between the pilot strength measurement region that is representative of the less favorable channel conditions, and a pilot strength measurement region that is representative of even less favorable channel conditions where the lowest transmission rate is selected. The "best" transmission rate based on the pilot strength measured by the mobile terminal can thus be selected. Similarly, two power spectral density threshold levels are used to define the boundaries based on the power spectral density measured by the mobile terminal from which the "best" transmission rate based on the measured power spectral density can be selected. Either one or both of these metrics can be used to select the transmission rate on the R-CSCH from among the transmission rates that are supported by the base station. For the pilot strength metric, as shown in FIG. 2, threshold levels of −7 dB and −10 dB are examples that define the pilot strength regions 201, 202, and 203, for 38400 bps, 19200 bps and 9600 bps transmission rates, respectively. If, for example, $E_c/I_o$ is measured by mobile terminal to be −9.5 dB, then a transmission rate of 19200 bps is selected. If $E_c/I_o$ is measured to be higher than −7 dB, which is indicative of favorable RF conditions (e.g., either a low traffic load or proximity of the mobile terminal to the base station), then the highest data rate of 38400 bps is selected. Similarly, if $E_c/I_o$ is measured to be less than −10 db, indicating that the mobile terminal 104 is in an area of high interference, then the lowest data rate of 9600 bps is selected.

Figure 3:
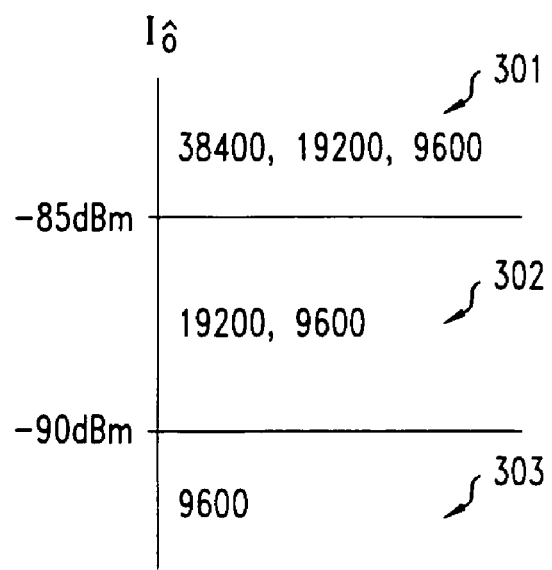
FIG. 3 shows and example of determining a transmission rate from among three supported rates by comparing the received power spectral density with two power spectral density thresholds.

As noted, the received power spectral density, $I_o$, measured by the mobile terminal 104 can be used either independently or conjunction with the measured $E_c/I_o$ to determine a transmission rate for R-CSCH. If used independently, for example, as shown in FIG. 3, threshold levels of −85 dBm and −90 dBm define three power spectral density regions: 1) region 301 where $I_o$ is measured to be greater than −85 dBm; 2) region 302 where $I_o$ is measured to be between −90 and −85 dBm; and 3) region 303 where $I_o$ is measured to be less than −90 dBm. If used as the sole metric in selecting a transmission rate, when the measured received power spectral density falls in region 301 where the received power is the strongest, which is indicative that the mobile terminal 104 is likely closest to the base station 101 within coverage area 110, then the mobile terminal selects the highest transmission rate of 38400 bps. When the measured received power spectral density falls within region 302, then the mobile terminal selects the middle rate of 19200 bps as the transmission rate. Similarly, if the received signal power spectral density falls in region 303 where the signal strength is weakest, indicative that the mobile terminal 104 is likely at the edge of the coverage area 110, then the mobile terminal selects the lowest transmission rate of 9600 bps.

When the pilot strength metric and the received power spectral density metric are used together by the mobile terminal to select a transmission rate, the region 301 represents the region where any of the three transmission rates can be selected, region 302 represents the region where 19200 bps and 9600 bps can be selected, and region 303 represents the region where only 9600 bps can be selected. Thus, if the measured pilot strength falls in region 202 in FIG. 2, indicating that the 19200 bps rate should be selected, and the received power spectral density falls within region 301, indicating that any of the three rates can be selected, then mobile terminal 104 selects the 19200 bps rate, which is the maximum transmission rate that satisfies both comparisons.

Figures 4, 5, 6:
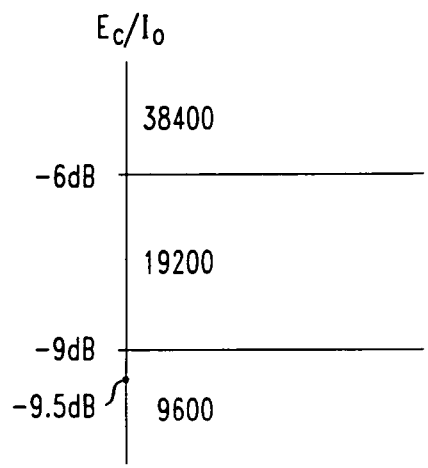
FIG. 4 shows a the example of FIG. 2 as modified by a threshold offset.
FIG. 5 shows an example of an EAPM message transmitted to the mobile terminals that includes a field containing the thresholds that are to be used by the mobile terminals in determining the transmission rate.
FIG. 6 shows the appropriate pilot strength and power spectral density thresholds, and offset threshold information within the EAPM message of FIG. 5.

In addition to using the thresholds associated with the pilot strength metric to select the appropriate R-CSCH transmission rate from among 38400 bps, 19200 bps, and 9600 bps, an offset can be provided to each mobile terminal 104 for use when re-probing an access attempt. This offset is used to modify the two pilot strength threshold levels when the mobile terminal 104 fails to receive an acknowledgement from the base station 101 in response to an initial probe transmitted on the R-CSCH. Thus, for example, if that offset is +1 dB, and the threshold levels as shown in FIG. 2 are initially −7 dB and −10 dB, they are modified to −6 dB and −9 dB, respectively, for the first re-probe attempt, as is shown in FIG. 4. If the measured pilot strength remains at the same −9.5 dB, as in the example of FIG. 2 described above, then when it is compared to the threshold levels that have been modified by the offset, the selected transmission rate now be used for transmitting the re-probe will be 9600 bps rather than the 19200 bps previously used for transmitting the initial probe.

In the described embodiment, the threshold levels that each mobile terminal 104 uses for comparison with the measured metric or metrics, and optionally the re-probe offset, are transmitted by the base station 101 in an Enhanced Access Parameters Message (EAPM), which is broadcast by the base station on a broadcast control channel (BCCH) to all the mobile terminals 104 within the coverage area 110. In a CDMA2000 system, a mobile terminal cannot transmit on the R-EACH unless it has received an EAPM from that base station. FIG. 5 shows an example of an EAPM500, which includes a message length field 501, a message ID field 502, a field containing power-related parameters 503, a field 504 containing the rates that the base station 101 supports for the R-CSCH, and a field 505 containing the parameters related to the operation of the reverse channel. The EAPM501 also includes a cyclic-redundancy-check (CRC) field 506. FIG. 6 shows the reverse channel related parameters included within field 505 of the EAPM. These include fields 601 and 602 for providing the $E_c/I_o$ and $I_o$ 19200 bps threshold levels, respectively, fields 603 and 604 for providing the $E_c/I_o$ and $I_o$ threshold levels, 38400 bps, respectively, and field 605 for providing a re-probe offset.

Advantageously, the service provider, is able to provide guidance to the mobile terminals 104 in coverage area 110 when more than one rate might be acceptable. By dynamically providing those thresholds to the mobile terminals 104, the service provider is able to control the rate selection algorithm used by the mobile terminals. Further, each base station 101 can independently select the thresholds appropriate for its coverage area and for the transmission rates it supports.

Although the thresholds have been described above as being provided to the mobile terminals 104 by the base station 101, the thresholds could be programmed into the mobile terminals in accordance with a service provider's specifications. These thresholds could be hard-coded into the mobile terminal software, or could be externally programmed into the mobile terminal software through the network. Although the embodiment described above has considered a system in having two thresholds for selecting among three supported R-CSCH transmission rates, the present invention can also be used in systems having any number of supported rates with an appropriate number of thresholds defining the boundaries between transmission rates for each metric used to determine the rate. Even further, the present invention could be employed in a system in which the transmission rate is adjustable on a continuum between maximum and minimum values. In this latter case, the mobile terminal could directly determine an appropriate transmission rate on the R-CSCH as a function of one or more channel-related measured metrics, such as the received pilot strength and/or the received power spectral density.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method at a mobile terminal in a wireless communications network in which the mobile terminal communicates with a base station, the method comprising the steps of:
   at a time prior to attempting to access the network by transmitting an access probe on a reverse common signaling channel, measuring at least one channel-related metric;
   comparing the measured at least one channel-related metric with at least one predetermined threshold level that is associated with the at least one channel-related metric, the at least one predetermined threshold level being determined before the access probe is transmitted;
   selecting a transmission rate for use on the reverse common signaling channel based on the comparison of the at least one measured channel-related metric with the at least one threshold level, the selection being made from among a plurality of possible transmission rates that are supported by the base station on the reverse common signaling channel.

2. The method of claim 1 wherein the channel-related metric is a pilot strength which is measured by the mobile terminal.

3. The method of claim 1 wherein the channel-related metric is power spectral density which is measured by the mobile terminal.

4. The method of claim 1 wherein the transmission rate is selected based on the channel-related metrics of both a pilot signal strength and a power spectral density which are measured by the mobile terminal.

5. The method of claim 1 wherein the plurality of possible transmission rates are transmission rates that are supported by the base station.

6. The method of claim 5 further comprising receiving the values of the supported rates from the base station prior to the transmission of the access probe.

7. The method of claim 1 further comprising receiving the at least one associated predetermined threshold level from the base station.

8. The method of claim 7 wherein the at least one associated threshold level is received from the base station in an overhead message that is continuously broadcast by the base station.

9. The method of claim 1 wherein the at least one associated threshold level is stored in the mobile terminal.

10. The method of claim 1 wherein the channel-related metric is a pilot strength the measurement of which is compared with at least one associated pilot strength threshold level to determine the transmission rate.

11. The method of claim 10 wherein the at least one pilot strength threshold level is modified by a re-probe offset to determine a transmission rate for a re-probe signal transmitted on the reverse common signaling channel.

12. The method of claim 11 wherein the re-probe offset is received from the base station.

13. The method of claim 1 wherein the channel-related metric is a power spectral density the measurement of which being compared with at least one associated power spectral density threshold level to determine the transmission rate.

14. The method of claim 1 wherein the channel-related metric is a both a pilot strength and a power spectral density the measurements of which being respectively compared with at least one associated pilot strength threshold level and at least one associated power spectral density threshold level to determine the transmission rate.

15. The method of claim 14 wherein the determined transmission rate is the maximum transmission rate that both comparisons indicate as being an acceptable transmission rate.

16. A method at a base station in a wireless communications network in which a mobile terminal communicates with the base station, the method comprising the steps of:
   transmitting at least one threshold level associated with at least one channel-related metric for subsequent use by the mobile terminal before it attempts to access the network by transmitting an access probe, the mobile terminal being operative to select a transmission rate on the reverse common signaling channel from among a plurality of transmission rates that are supported by the base station on the reverse common signaling channel by comparing the at least one threshold level received from the base station with at least one channel-related metric has been measured by the mobile terminal at a time prior to attempting to access the network by transmitting an access probe.

17. The method of claim 16 wherein the at least one threshold level is transmitted in an overhead message that is continuously broadcast by the base station.

18. The method of claim 16 wherein the information further comprises a plurality of possible transmission rates that the base station supports on the reverse common signaling channel.

19. The method of claim 16 wherein the channel-related metric is a pilot strength, which is measured by the mobile terminal, and the associated at least one threshold level is at least one pilot strength threshold level.

20. The method of claim 19 wherein the information further comprises a re-probe offset for use by the mobile terminal in modifying the at least one pilot strength threshold level for determining a transmission rate for a re-probe signal transmitted by the mobile terminal on the reverse common signaling channel.

21. The method of claim 16 wherein the channel-related metric is a power spectral density, which is measured by the mobile terminal, and the associated at least one threshold level is at least one power spectral density threshold level.

22. The method of claim 16 wherein the channel-related metric is both a pilot strength and a power spectral density, which are both measured by the mobile terminal, and the associated at least one threshold level is at least one pilot strength threshold level and at least one power spectral density threshold.

* * * * *